Figure 1:
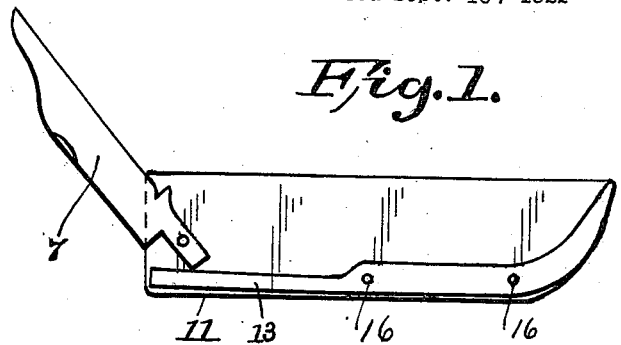

June 12, 1923.

J. P. WIDAS ET AL 1,458,789

MINER'S KNIFE

Filed Sept. 16, 1922

Inventor.
Joseph Philip Widas and
Frank Stephen Widas
By John A. Saul
Attorney.

Patented June 12, 1923.

1,458,789

UNITED STATES PATENT OFFICE.

JOSEPH PHILIP WIDAS AND FRANK STEPHEN WIDAS, OF CASPIAN, MICHIGAN.

MINER'S KNIFE.

Application filed September 16, 1922. Serial No. 588,710.

*To all whom it may concern:*

Be it known that we, JOSEPH PHILIP WIDAS, a citizen of the United States, and FRANK STEPHEN WIDAS, a citizen of Yugoslavia, residing at Caspian, in the county of Iron and State of Michigan, have invented certain new and useful Improvements in Miners' Knives, of which the following is a specification.

My invention relates to miners' knives, for use in holding, cutting, and splitting fuses, and the like; the same consisting of a plurality of knives and operating levers or handles, by means of which the fuses may be cut into the desired lengths, and the same may be then split for use. It also comprehends the use of a blade for general purposes, such as cutting dynamite sticks, or other purposes.

The object of the invention is to so construct the same that it will be durable, easily and cheaply manufactured, will be efficient, and the parts composing the device may be replaced or repaired when broken or worn.

In the drawings forming a part of this specification, and in which like symbols of reference represent corresponding parts in the several views:—

Figure 2:
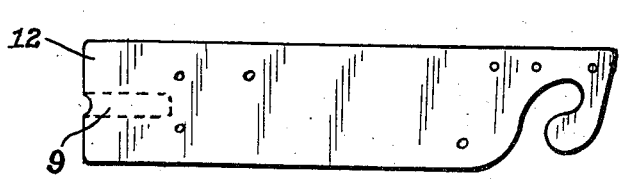
Figure 3:
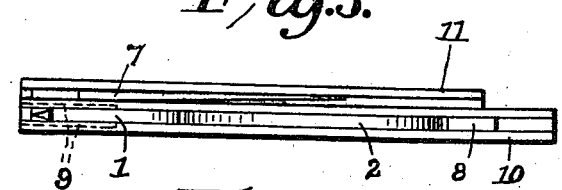
Figure 4:
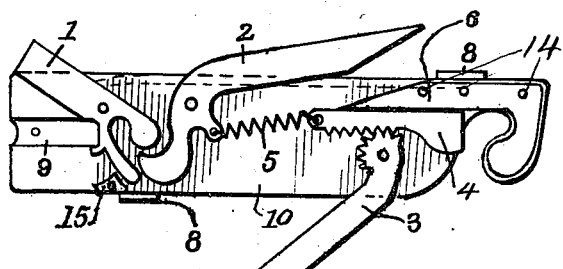

Figure 1 represents a side view of one part of my device;

Figure 2 the side of the handle opposite to Figure 1;

Figure 3 a back view of the device; and,

Figure 4 a view of the device with the side scale removed to show the interior of the same.

In the drawings, 1 represents the blade to split the fuse; 2 the handle or lever to operate the blade; 3 a handle to operate blade 4, which is adapted to cut the fuse; and 5 is a spring for the levers. 6 is a slide or guide for the knife 4; and 7 is a knife blade for general use, the same being located in an additional part of the device.

8 are clips to receive and hold the levers when the device is closed and in disuse. 9 is a hole to receive and hold the fuse to be split; and 10 is one side of the handle. 11 is the side of the handle next the knife; and 12 side of handle corresponding to side 10. The hole 9, it will be observed, is formed in sides 10 and 12, the same registering with each other. 13 is a spring for the knife 7, the same being held in the handle by rivets 16, and 14 rivets which hold the guide 6 and sides. The operation will be apparent from the foregoing description.

15 is a washer to hold the sides in proper relation to each other.

Having now fully described my invention, what I claim as new, and desire to secure by Letters-Patent is:—

1. A miner's knife, comprising a handle, a blade pivoted in the handle, a lever to operate the blade, a second blade slidably supported in the handle, and a lever to operate the sliding blade.

2. A miner's knife, comprising a handle, a sliding knife supported in the same, a lever to operate the same, a knife pivoted in the handle, a lever to operate the same, and a spring connected to the sliding knife and lever of the pivoted knife to hold the same normally out of operation.

3. A device of the character described, comprising a main handle, a sliding knife formed with a rack, a lever having a pinion working in the rack, a knife pivoted in the handle, a lever to operate the same, means to hold the knives normally out of operation, a hole to receive a fuse to be slit, and a guide for the sliding knife.

4. A miner's knife, comprising a handle, a blade pivoted in the handle, a lever pivoted in the handle and having its rear end engaging the rear end of the blade to operate the same, a sliding knife, a lever to operate the same, and clips to engage and hold the levers when in disuse.

In testimony whereof we affix our signatures.

JOSEPH PHILIP WIDAS.
FRANK STEPHEN WIDAS.